June 8, 1926. 1,588,064
J. J. THACHER
DRIVING MECHANISM
Filed Dec. 8, 1921
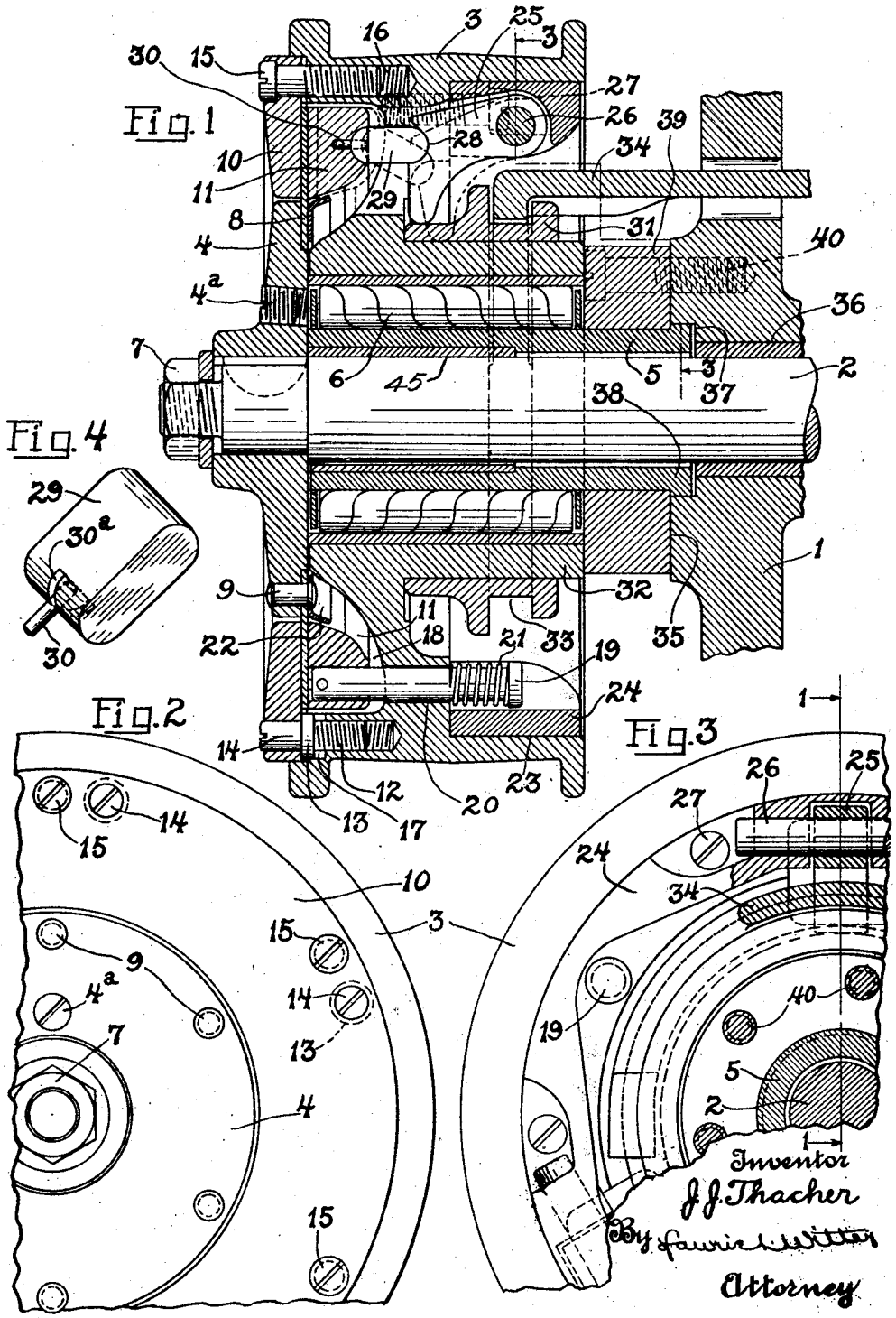
Inventor
J. J. Thacher
By Laurie L. Witter
Attorney Patented June 8, 1926.

1,588,064

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

DRIVING MECHANISM.

Application filed December 8, 1921. Serial No. 521,003.

This invention relates to driving mechanism of the friction clutch type and the primary object of the invention is to provide an improved compact mechanism of this type in which are embodied certain improved features to be described.

It is an object of the invention to provide a friction clutch driving mechanism including improved concentrically mounted driving and driven elements and means for supporting the driving element independently of the driven element.

It is an object of the invention to provide a unitary driving mechanism combining a driving pulley and friction clutch means mounted therein in an improved manner, the mechanism being adapted to be mounted substantially as a unit on a machine to be driven thereby.

It is a further object of the invention to provide an improved mechanism of the type stated combining driving and driven elements with friction clutch mechanism therebetween, novel means for accurately adjusting a portion of the clutch mechanism for wear, and an improved arrangement of parts whereby the mechanism may be more compactly and readily assembled.

With the above and other objects in view, my invention consists in the features of construction and operation set forth in the following specification and illustrated in the accompanying drawing. In such drawing annexed hereto and forming a part of this specification, I have shown one embodiment of my invention as mounted on the frame of a machine to be operated thereby, but it will be understood that the invention can be otherwise embodied and that the drawing is not to be construed as defining or limiting the scope of the invention, the claims appended to this specification being relied upon for that purpose.

Referring to the figures of the drawing:

Figure 1 is a longitudinal sectional view of a driving mechanism illustrative of my invention, such view being taken on line 1—1 of Fig. 3.

Fig. 2 is a fragmentary front view thereof.

Fig. 3 is a fragmentary rear view thereof partially in section on line 3—3 of Fig. 1.

Fig. 4 is a detail view of a toggle block used in the improved mechanism.

Referring more specifically to the drawing by reference characters, 1 indicates a wall of a machine to which the driving mechanism is illustrated as being attached, such wall providing a support for the driving mechanism. An operating shaft 2 of the machine is illustrated as extending outwardly therefrom.

The driving mechanism comprises a driving element, illustrated as a pulley 3, and a driven element 4. The pulley is rotatably supported on a bushing 5, anti-friction roller bearings 6 being interposed between the pulley and bushing. The driven element 4 is illustrated as keyed to the end of shaft 2, a nut 7 serving to hold the element and driving mechanism in place. An opening in the element 4, normally closed by a threaded plug 4ª, provides a port through which the bearings 6 may be lubricated.

Inter-engaging friction driving means is provided between the pulley 3 and driven element 4 as follows: An annular friction plate 8 is secured to the element 4, as by rivets 9. This plate is adapted to be engaged between a normally fixed annular plate member 10 and a cooperating axially movable member 11 on the pulley. Means are provided for adjustably securing the member 10 to the pulley as follows: A plurality of studs 12, each provided with a flange 13 thereon, are threaded into the pulley. The plate 10 is provided with openings therein receiving the outer extended portions 14 of the studs. A screw 15 extends through the plate 10 and is threaded into a bore 16 in the pulley adjacent each stud 12, such screws being adapted to draw the plate into tight engagement with the flanges 13 on the studs. It will be seen that by adjusting the studs 14 and screws 15, the plate 10 may be adjusted axially as desired. It should furthermore be noted that the flanges 13 of the studs fit accurately into bores 17 in the pulley whereby the lateral driving thrust of the plate 10 thereon is taken by such flanges within their bores instead of by the threaded portions of the studs.

The friction ring member 11 is mounted in a recess 18 in the front face of the pulley and is secured to the pulley by means of pins 19. Three of these pins are preferably provided and each has one end secured to the ring 11, extends through a bore 20 in the pulley and is provided with a spring 21 thereon normally acting to draw the ring away from the friction plates 8 and 10. These pins therefore serve the double function of non-rotatably securing the ring member 11 to the pulley and normally disengaging the clutch. A dished element 22 is secured to the element 4 within the ring for preventing oil and foreign matter from entering between the friction plates.

The rear face of the pulley is recessed at 23 to receive a ring 24 therein. This ring has a plurality of clutch operating elements, as toggle levers 25, mounted in recesses therein. The construction illustrated in the drawing is provided with three such levers, each of which is pivotally mounted in the ring by means of a pin 26. The ring, with its operating levers, is adapted to be assembled in the pulley recess 23 as a unit, and is secured in position therein by means of screws 27 extending through the ring and threaded into the pulley. The inner free end of each lever is provided with a recess 28 adapted to receive a toggle block 29 therein, the other end of each toggle block being adapted to fit into a corresponding recess in the movable friction ring 11. A pin 30 is seated in the ring 11 and engages in a slot 30ᵃ in the block for holding such block in place. The levers and toggle blocks are adapted to be operated by means of a collar 31 axially slidable on a hub 32 of the pulley. This collar is circumferentially grooved at 33 and an operating member 34 engages in such groove for sliding the collar axially.

In Fig. 1, the driving mechanism comprising the invention is illustrated as being a unitary structure adapted to be secured to the exterior of a machine. The wall 1 of the machine is provided with a pad 35 thereon about the opening 36 through which the shaft 2 projects. The outer end of opening 36 is counterbored at 37 to receive therein the shouldered end 38 of the bushing 5. A supporting block 39 is mounted on the bushing between the bushing shoulder 38 and the hub 32 of the pulley 3. This block is adapted to seat against the pad 35 and to be secured thereon by means of bolts 40. As thus assembled, the pulley is supported on the bushing 5, which is rigidly supported on the machine frame by the block 39 in the manner described. It will therefore be seen that the driving pulley is rotatably supported on the machine frame independently of the shaft 2. A bushing 45 is provided for the shaft 2. The bushing 45 is supported in the pulley bushing 5.

The driving mechanism may be readily assembled within the pulley 3 in the manner heretofore disclosed. In assembling the mechanism on the shaft 2, the bushing 5 and block 39 are first placed over the shaft and secured in position on the frame 1 by means of bolts 40. The driving mechanism may then be mounted on the bushing and shaft as a unit and secured thereon by means of nut 7.

The pulley is rotatably supported on the bushing 5 independently of the shaft 2. With the collar 31 drawn outwardly and the toggle mechanism in the position indicated in dotted lines in Fig. 1, the pulley is adapted to rotate freely on the bushing and shaft. When it is desired to drive the shaft, the collar 31 is forced inwardly by means of the operating member 34 whereby the toggle elements are straightened to the position indicated in full lines in Fig. 1. In this position the friction ring member 11 is forced toward its cooperating member 10 whereby the friction plate 8 therebetween and secured to the shaft 2 is frictionally gripped in a manner to drive the same and the shaft 2 from the pulley.

What I claim is:

1. A friction clutch comprising the combination of a driven element adapted to be secured to a shaft, a bushing adapted to surround the shaft, a pulley rotatably mounted on the bushing, inter-engaging friction driving means on the driven element and pulley comprising a friction member on the driven element adapted to be engaged between a normally fixed member and a cooperating axially movable member on the pulley, screw threaded means for securing the normally fixed member to the pulley and for adjusting the same axially thereon, means for moving the cooperating member axially to engage or disengage the friction member on the driven element, and means for securing the bushing to a support whereby the same supports the pulley independently of the shaft.

2. A friction clutch comprising the combination of a driving element and a driven element, inter-engaging friction driving means on the two elements comprising a friction member on the driven element adapted to be engaged between a normally fixed member and a cooperating axially movable member on the driving element, a plurality of screws threadedly engaging the driving element and each provided with a head thereon beneath and supporting the normally fixed member and with an extended portion engaging within the said member, a plurality of screws passing through the last said member, threadedly engaging the driving element adjacent the first named screws and provided with heads thereon engaging the exterior of the member, all of said screws providing a means for adjusting the said member axially, and means for moving the cooperating member axially to engage or disengage the friction member on the driven element.

3. In a friction clutch, the combination of a shaft, a driving element and a driven element, one element being secured to the shaft and the other element being mounted to rotate concentrically over the shaft, means comprising a normally fixed member and an axially movable member on one element adapted to engage the other element therebetween for driving the same, a plurality of screws normally preventing the movement of the normally fixed member toward the movable member, a plurality of screws for holding the normally fixed member seated against the first named screws, said two sets of screws combining to provide means for adjusting the said member toward and from the movable member, means for holding the normally fixed member against rotation on its element, and means for moving the movable member axially to engage or disengage the clutch.

4. In a friction clutch, the combination of a shaft, a driving element and a driven element, one element being secured to the shaft and the other element being mounted to rotate concentrically over the shaft, means comprising a normally fixed member and an axially movable member on one element adapted to engage the other element therebetween for driving the same, a plurality of screws for securing the normally fixed member against rotation on its element and for adjustably preventing the movement of such member toward the movable member, a plurality of screws for holding the normally fixed member seated against the first named screws, said two sets of screws combining to provide means for adjusting the said last mentioned member toward and from the movable member, and means for moving the movable member axially to engage or disengage the clutch.

5. In a friction clutch, the combination of a shaft, a driven element fixed thereon, a driving element, a stationary bushing surrounding the shaft and mounted independently of the shaft for said driving element, an annular normally fixed plate secured to the driving element, means for adjusting the plate with respect to the driving element, a cooperating movable ring within the driving element, spring actuated pins within the driving element securing the ring to the driving element and acting to normally hold the same away from the plate, an annular plate secured to the driven element and extending between the first said plate and ring, and means including a member slidable axially on a hub of the driving element for forcing the ring toward the said plates to frictionally grip and drive the plate on the shaft.

6. In a friction clutch, the combination of a shaft, a driven element fixed thereon, a driving element mounted to rotate concentrically over the shaft, an annular plate secured to the driving element, means for adjusting the plate axially with respect to the driving element, a cooperating movable ring within the driving element, spring actuated pins within the driving element securing the ring to the driving element and acting to normally hold the same away from the plate, an annular plate secured to the driven element and extending between the first said plate and ring, and means for forcing the ring toward the said plates to frictionally grip and drive the plate on the shaft.

7. A driving mechanism comprising the combination of a shaft, a driving pulley loosely mounted thereon and recessed in the opposite faces thereof, an annular plate secured to one face of the pulley, an annular ring secured to the pulley within the recess adjacent the said plate, an annular plate secured to the shaft and extending between the plate and ring on the pulley, a ring with a plurality of clutch operating elements mounted therein adapted to be assembled in the opposite pulley recess as a unit, means for securing such ring in the pulley, and means cooperating with the ring elements for forcing the first mentioned ring toward the plates to frictionally grip and drive the plate on the shaft.

8. A driving mechanism comprising the combination of a shaft, a driving pulley loosely mounted thereon and recessed in the opposite faces thereof, an annular plate secured to one face of the pulley, an annular ring secured to the pulley within the recess adjacent the said plate, an annular plate secured to the shaft and extending between the plate and ring on the pulley, a ring with a plurality of toggle levers mounted therein adapted to be assembled in the opposite pulley recess as a unit, means for securing such ring in the pulley, and means cooperating with the levers for forcing the first mentioned ring toward the plates to frictionally grip and drive the plate on the shaft.

In testimony whereof, I hereto affix my signature.

JOHN J. THACHER.